US011080385B1

(12) United States Patent
Angara et al.

(10) Patent No.: US 11,080,385 B1
(45) Date of Patent: Aug. 3, 2021

(54) SYSTEMS AND METHODS FOR ENABLING MULTI-FACTOR AUTHENTICATION FOR SEAMLESS WEBSITE LOGINS

(71) Applicant: Symantec Corporation, Mountain View, CA (US)

(72) Inventors: SriHarsha Angara, Mountain View, CA (US); Michael Lo, Culver City, CA (US); Simon Tiku, Culver City, CA (US); John Meehan, Culver City, CA (US)

(73) Assignee: NortonLifeLock Inc., Tempe, AZ (US)

( * ) Notice: Subject to any disclaimer, the term of this patent is extended or adjusted under 35 U.S.C. 154(b) by 396 days.

(21) Appl. No.: 16/139,239

(22) Filed: Sep. 24, 2018

(51) Int. Cl.
G06F 21/30 (2013.01)
G06F 21/40 (2013.01)
G06F 9/54 (2006.01)
H04L 29/06 (2006.01)
G06F 21/42 (2013.01)

(52) U.S. Cl.
CPC ............. G06F 21/40 (2013.01); G06F 9/54 (2013.01); G06F 21/42 (2013.01); H04L 63/08 (2013.01)

(58) Field of Classification Search
CPC ....... G06F 21/40; G06F 21/305; G06F 21/313
See application file for complete search history.

(56) References Cited

U.S. PATENT DOCUMENTS

| 5,623,637 A * | 4/1997 | Jones | G06F 12/1466 710/13 |
| 6,035,406 A * | 3/2000 | Moussa | G06F 21/31 380/30 |
| 8,693,655 B1 * | 4/2014 | Chau | H04M 17/10 379/201.01 |
| 10,068,082 B1 * | 9/2018 | Zheng | G06F 21/34 |

(Continued)

FOREIGN PATENT DOCUMENTS

WO WO-2008024362 A2 * 2/2008 ........... H04L 9/3228

OTHER PUBLICATIONS

Google Developers, "Request SMS Verification in an Android App", accessed on Sep. 19, 2017, from https://developers.google.com/identity/sms-retriever/request, 6 pages.

(Continued)

*Primary Examiner* — Ponnoreay Pich
(74) *Attorney, Agent, or Firm* — FisherBroyles, LLP

(57) ABSTRACT

The disclosed computer-implemented method for enabling multi-factor authentication for seamless website logins may include (1) generating a numerical sequence utilized for authenticating a user for multi-factor authentication on a website, (2) detecting user login credentials for initiating a multi-factor authentication session on the website, (3) receiving, in response to the user login credentials, a request for multi-factor authentication data associated with the numerical sequence from the website, (4) retrieving, utilizing an application programming interface (API), the multi-factor authentication data from a secure storage associated (Continued)

with the user, and (5) providing, utilizing the API, the multi-factor authentication data to the website to login the user. Various other methods, systems, and computer-readable media are also disclosed.

17 Claims, 7 Drawing Sheets

(56) References Cited

U.S. PATENT DOCUMENTS

| | | | | |
|---|---|---|---|---|
| 2005/0273442 | A1* | 12/2005 | Bennett | H04L 9/3215 |
| | | | | 705/67 |
| 2007/0043681 | A1* | 2/2007 | Morgan | G06F 21/36 |
| | | | | 705/67 |
| 2007/0255953 | A1* | 11/2007 | Peyret | H04L 63/1483 |
| | | | | 713/168 |
| 2008/0028228 | A1* | 1/2008 | Mardikar | H04L 63/08 |
| | | | | 713/184 |
| 2008/0162338 | A1* | 7/2008 | Samuels | G06Q 40/025 |
| | | | | 705/38 |
| 2008/0250477 | A1* | 10/2008 | Samuelsson | H04L 9/3273 |
| | | | | 726/4 |
| 2010/0125635 | A1* | 5/2010 | Axelrod | H04L 63/0838 |
| | | | | 709/206 |
| 2019/0014097 | A1* | 1/2019 | Hwang | H04L 63/08 |

OTHER PUBLICATIONS

Hardwick, Tim "How to Use Secure Code AutoFill in iOS 12 and macOS Mojave", Aug. 14, 2018, from https://www.macrumors.com/how-to/use-secure-code-autofill-ios-12-macos-mojave/, 3 pages.

* cited by examiner

SYSTEMS AND METHODS FOR ENABLING MULTI-FACTOR AUTHENTICATION FOR SEAMLESS WEBSITE LOGINS

BACKGROUND

Sophisticated network attacks often render simple password authentication insufficient to protect unauthorized access to enterprise and consumer networks and applications. Traditional solutions to combat these threats include multi-factor (e.g., second factor) authentication that may include obtaining out-of-band user approval for user login events using a mobile device. For example, a traditional second factor authentication solution may include requesting a user to enter an additional one-time password (i.e., a mobile credential) that a website's authentication server sends to the user's mobile device, in addition to providing a username/password combination.

However, a multi-factor authentication setup option may rarely be presented as part of the user sign-up process for websites that may be accessed by only providing a username/password combination. Moreover, even when multi-factor authentication is presented as an option (either at sign-up or after log-in), users may often find the setup process to be tedious, difficult, and/or time consuming as compared to less secure traditional methods which may facilitate user logins to websites through the use of password managers. However, these less secure traditional authentication methods may also subject users to increased attacks by malicious actors during Internet web browsing sessions.

SUMMARY

As will be described in greater detail below, the instant disclosure describes various systems and methods for enabling multi-factor authentication for seamless website logins.

In one example, a computer-implemented method for enabling multi-factor authentication for seamless website logins may include (1) generating a numerical sequence utilized for authenticating a user for multi-factor authentication on a website, (2) detecting user login credentials for initiating a multi-factor authentication session on the website, (3) receiving, in response to the user login credentials, a request for multi-factor authentication data associated with the numerical sequence from the website, (4) retrieving, utilizing an application programming interface (API), the multi-factor authentication data from a secure storage associated with the user, and (5) providing, utilizing the API, the multi-factor authentication data to the website to login the user.

In some examples, the computer-implemented method may further include (1) detecting an initial user login into the website, (2) retrieving one or more rules for establishing the multi-factor authentication on the website, and (3) sending a user notification including a request to enable a service providing the multi-factor authentication. In some embodiments, the computer-implemented method may further include (1) displaying a dashboard including multiple websites providing multi-factor authentication services and (2) sending a user notification including a request to enable the multi-factor authentication services.

In some examples, the computer-implemented method may further include (1) sending a request to unlock the secure storage and (2) receiving a confirmation that the secure storage is unlocked. In some embodiments, generating the numerical sequence may include generating an anonymized telephone number. Additionally or alternatively, generating the numerical sequence may include retrieving an existing telephone number associated with the user.

In some embodiments, the multi-factor authentication data may include a confirmation code sent from the website to the secure storage utilizing the numerical sequence. Additionally or alternatively, the multi-factor authentication data may include a token sent from the website to the secure storage utilizing the numerical sequence.

In one embodiment, a system for enabling multi-factor authentication for seamless website logins may include at least one physical processor and physical memory that includes multiple modules and computer-executable instructions that, when executed by the physical processor, cause the physical processor to (1) generate, by a setup module, a numerical sequence utilized for authenticating a user for multi-factor authentication on a website, (2) detect, by a detection module, user login credentials for initiating a multi-factor authentication session on the website, (3) receive, by a receiving module and in response to the user login credentials, a request for multi-factor authentication data associated with the numerical sequence from the website, (4) retrieve, by a login module utilizing an application programming interface (API), the multi-factor authentication data from a secure storage associated with the user, and (5) provide, by the login module utilizing the API, the multi-factor authentication data to the website to login the user.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) generate a numerical sequence utilized for authenticating a user for multi-factor authentication on a website, (2) detect user login credentials for initiating a multi-factor authentication session on the website, (3) receive, in response to the user login credentials, a request for multi-factor authentication data associated with the numerical sequence from the website, (4) retrieve, utilizing an application programming interface (API), the multi-factor authentication data from a secure storage associated with the user, and (5) provide, utilizing the API, the multi-factor authentication data to the website to login the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
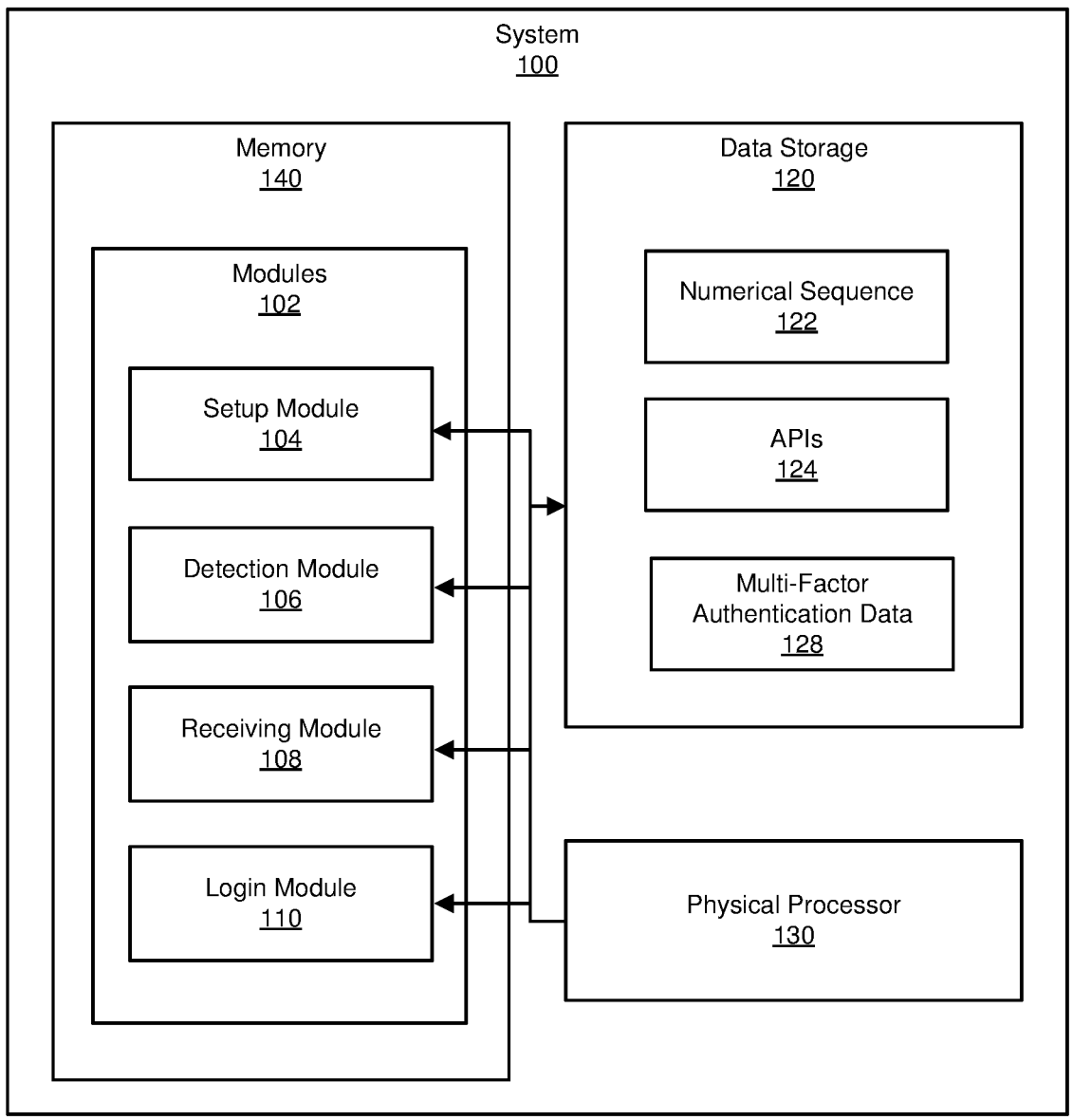
FIG. 1 is a block diagram of an example system for enabling multi-factor authentication for seamless website logins.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for enabling multi-factor authentication for seamless website logins. As will be described in greater detail below, by generating a numerical sequence (e.g., an anonymized telephone number) to enroll a user in multi-factor authentication on compatible websites and providing an API for retrieving a multi-factor credential from a user-controlled secure vault, the systems and methods described herein may enable a client computing device to enhance user security by reducing the number of user actions needed to enable and utilize multi-factor authentication during user web browsing sessions. By utilizing the numerical sequence and the APIs in this way, the systems and methods described herein may be able to automate and/or reduce many of the user actions typically associated with identifying and enrolling in websites that support multi-factor authentication, such as manually entering a second factor credential, thereby increasing the potential use of this secure authentication method and further increasing protection against less secure methods that may be exploited by malicious actors.

Moreover, the systems and methods described herein may improve computing device security by facilitating the setup and use of multi-factor authentication to provide secure web browsing sessions that are less susceptible to malicious attacks than less secure authentication methods.

Figure 2:
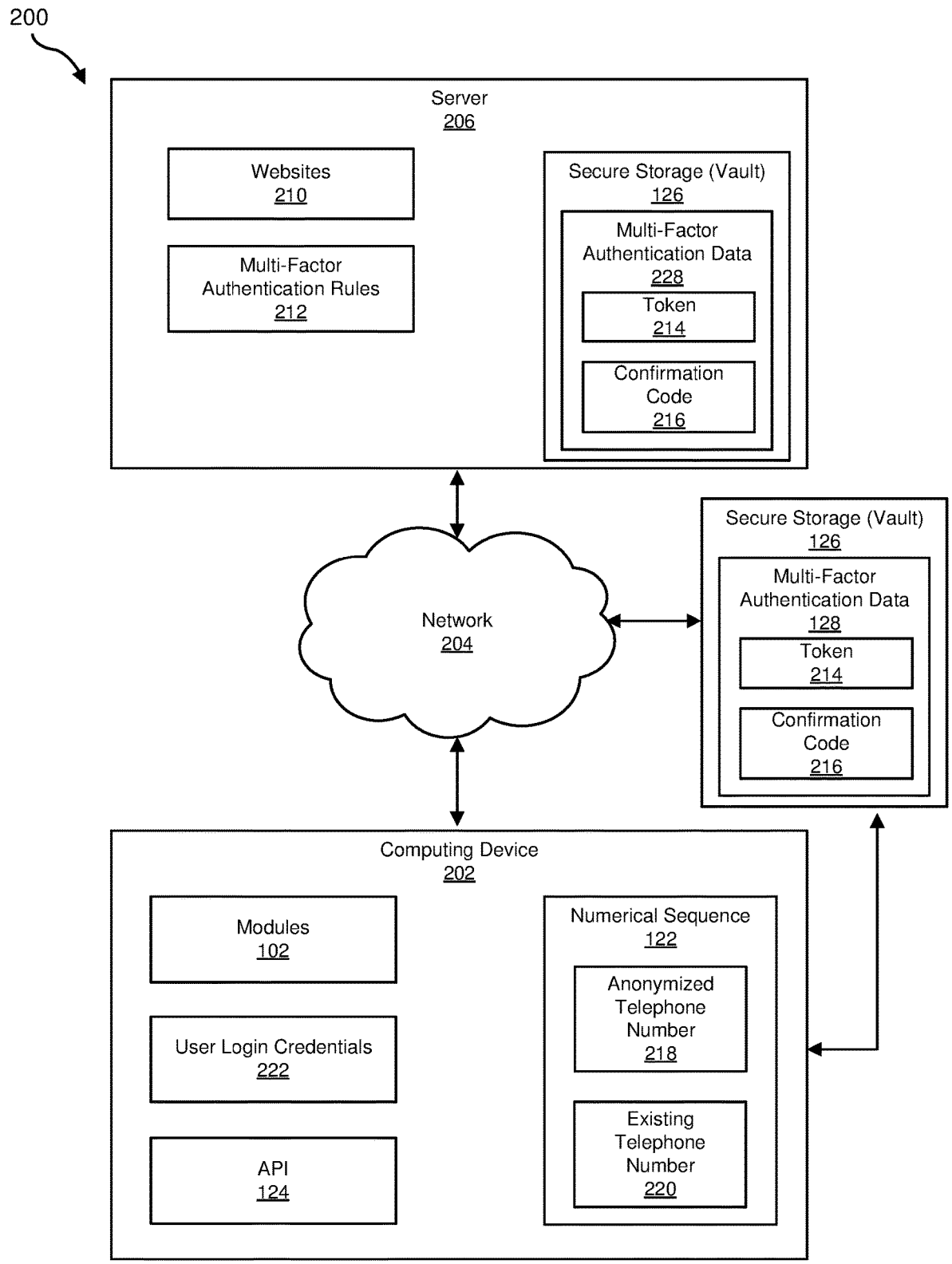
FIG. 2 is a block diagram of an additional example system for enabling multi-factor authentication for seamless website logins.

The following will provide, with reference to FIGS. 1-2, detailed descriptions of example systems for enabling multi-factor authentication for seamless website logins. Detailed descriptions of corresponding computer-implemented methods will also be provided in connection with FIGS. 3-4. Detailed descriptions of an example dashboard in an example system for enabling multi-factor authentication for seamless website logins will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for enabling multi-factor authentication for seamless website logins. In certain embodiments, one or more of modules 102 in FIG. 1 may represent one or more software applications or programs that, when executed by a computing device, may cause the computing device to perform one or more tasks. For example, and as will be explained in greater detail below, example system 100 may include a setup module 104 that generates a numerical sequence 122 utilized for authenticating a user for multi-factor authentication on a website. Example system 100 may additionally include a detection module 106 that detects user login credentials for authenticating a multi-factor authentication session on the website. Example system 100 may also include a receiving module 108 that receives, in response to the user login credentials, a request for multi-factor authentication data 126 associated with the numerical sequence from the website. Example system 100 may additionally include a login module 110 that utilizes one or more application programming interfaces (APIs) 124 to retrieve the multi-factor authentication data from a secure storage associated with the user and to provide the multi-factor authentication data to the website to login the user.

For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate enabling multi-factor authentication for seamless website logins. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store numerical sequence 122, APIs 124, and multi-factor authentication data 126 on a computing device.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to enable multi-factor authentication for seamless website logins.

Computing device 202 generally represents any type or form of computing device capable of reading computer-executable instructions. In some embodiments, computing device 202 may represent an endpoint device running client-side privacy and/or identity protection security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading computer-executable instructions. In some examples, server 206 may be a cloud-based authentication server providing credentials and setting up user/password combinations for user multi-factor authentication on one or more websites. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Secure storage 208 generally represents any type or form of data storage for storing credentials utilized to authenticate user access to access one or more websites supporting multi-factor authentication. In some examples, secure storage 208 may be a user-controlled storage (e.g., a vault) hosted on server 206 storing multi-factor authentication data 128. In other examples, secure storage 208 may be a mobile computing device in communication with and/or in proximity to computing device 202. Multi-factor authentication data 128 may include token 214 and confirmation code 216. Token 214 and confirmation code 216 may be out-of-band credentials utilized in multi-factor authentication communication between server 206 and computing device 202 based on multi-factor authentication rules 212.

Numerical sequence 122 generally represents any type or form of a sequence of digits associated that serves as an address for a subscriber to use for communication. In some examples, numerical sequence 122 may be a telephone number (e.g., existing telephone number 220) associated with a user of a mobile computing device for communications over a wireless and/or wireline telephony network which may be utilized by modules 102 to setup multi-factor authentication on websites 210 on behalf of a user of computing device 202. In other examples, and as will be described in greater detail below, numerical sequence 122 may be an anonymized telephone number, generated by modules 102, for a user of computing device 202 to setup multi-factor authentication on websites 210. User login credentials 222 may be a username/password combination for a user to login to websites 210.

Figure 3:
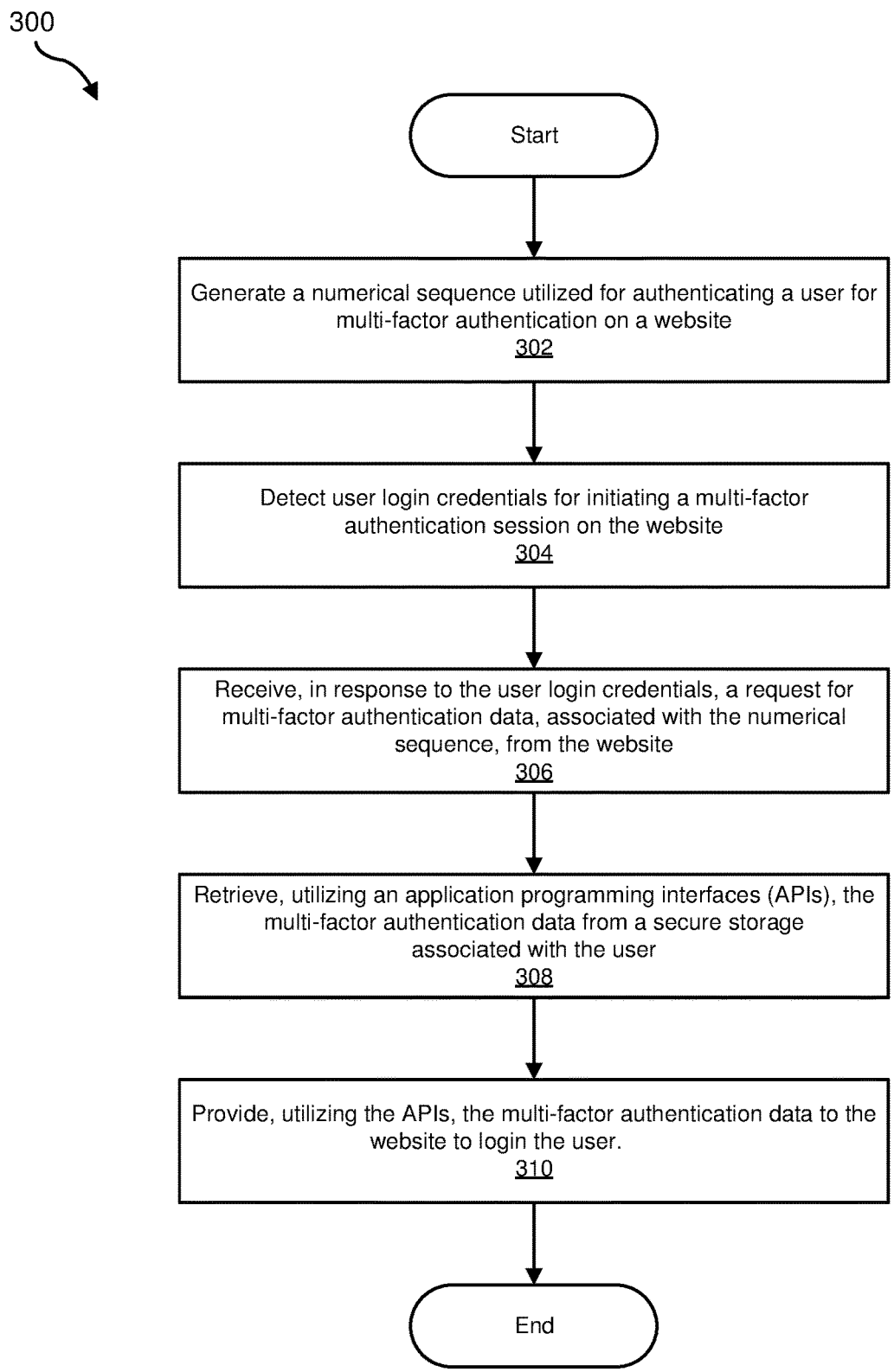
FIG. 3 is a flow diagram of an example method for enabling multi-factor authentication for seamless website logins.

FIG. 3 is a flow diagram of an example computer-implemented method 300 for enabling multi-factor authentication for seamless website logins. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple substeps, examples of which will be provided in greater detail below.

As illustrated in FIG. 3, at step 302 one or more of the systems described herein may generate a numerical sequence utilized for authenticating a user for multi-factor authentication on a website. For example, setup module 104 may, as part of computing device 202 in FIG. 2, generate numerical sequence 122 for authenticating a user for multi-factor authentication on one or more websites 210.

Setup module 104 may generate numerical sequence 122 in a variety of ways. In some examples, setup module 104 may generate numerical sequence 122 as anonymized telephone number 218. In some embodiments, anonymized telephone number 218 may be a numerical sequence, generated by setup module 104, that corresponds to a telephone number that would be recognized by multi-factor authentication rules 212 associated with websites 210 as an out-of-band communication channel for sending token 214 or confirmation code 216 in a multi-factor authentication session. In other examples, setup module 104 may generate numerical sequence 122 as existing telephone number 220 associated with a user of computing device 202. For example, existing telephone number 220 may be a telephone number associated with a user's mobile telephone or other mobile computing device. In some examples, the user's mobile computing device may include secure storage 208.

At step 304, one or more of the systems described herein may detect user login credentials for initiating a multi-factor authentication session on the website. For example, detection module 106 may, as part of computing device 202 in FIG. 2, automatically detect when a user enters user login credentials 222 in a website 210.

Detection module 106 may detect user login credentials 222 in a variety of ways. For example, detection module 106 may detect when a user, via setup module 104, enters their username/password combination into a website 210 after having previously opted-in for multi-factor authentication.

An example opt-in process for enrolling a user for multi-factor authentication will be described in greater detail below with respect to FIG. 4.

At step 306, one or more of the systems described herein may receive, in response to the user login credentials being detected, a request for multi-factor authentication data, associated with the numerical sequence, from the website. For example, receiving module 108 may, as part of computing device 202 in FIG. 2, receive, in response to user login credentials 222 being detected at step 304, a request from a website 210 for multi-factor authentication data 128 that is associated with numerical sequence 122.

Receiving module 108 may receive a request for multi-factor authentication data 128 in a variety of ways. In some examples, receiving module 108 may receive a request from one or more websites 210 for token 214 or confirmation code 216 previously sent by websites 210 to secure storage 208 in response to websites 210 receiving numerical sequence 122. For example, after a user has submitted user login credentials 222, receiving module 108 may receive a request from websites 210 for token 214 or confirmation code 216 previously sent to secure storage 208 in response to receiving numerical sequence 122 (e.g., anonymized telephone number 218 or existing telephone number 220).

At step 308, one or more of the systems described herein may retrieve, utilizing an application programming interfaces (APIs), the multi-factor authentication data from a secure storage associated with the user. For example, login module 110 may, as part of computing device 202 in FIG. 2, retrieve, utilizing APIs 124, multi-factor authentication data 128 from secure storage 208.

Login module 110 may utilize APIs 124 to retrieve multi-factor authentication data 128 in a variety of ways. In some examples, login module 110 may confirm whether or not a user has granted access to secure storage 208 and if the user has not granted access, send a request for the user to provide access to (e.g., unlock) secure storage 208 and receive a confirmation prior to attempting to retrieve multi-factor authentication data 128. Upon confirming that the secure storage 208 is unlocked, login module 110 may then utilize APIs 124 to programmatically retrieve multi-factor authentication data 128 (e.g., token 214 or confirmation code 216) from secure storage 208.

At step 310, one or more of the systems described herein may provide, utilizing the APIs, the multi-factor authentication data to the website to login the user. For example, login module 110 may, as part of computing device 202 in FIG. 2, utilize APIs 124 to provide multi-factor authentication data 128 to websites 210 to login the user.

Login module 110 may utilize APIs 124 to provide multi-factor authentication data 128 to websites 210 in a variety of ways. In some examples login module 110 may utilize APIs 124 to automatically utilize previously retrieved multi-factor authentication data 128 to fill a field in a website 210 for receiving token 214 or confirmation code 216, on behalf of the user.

Figure 4:
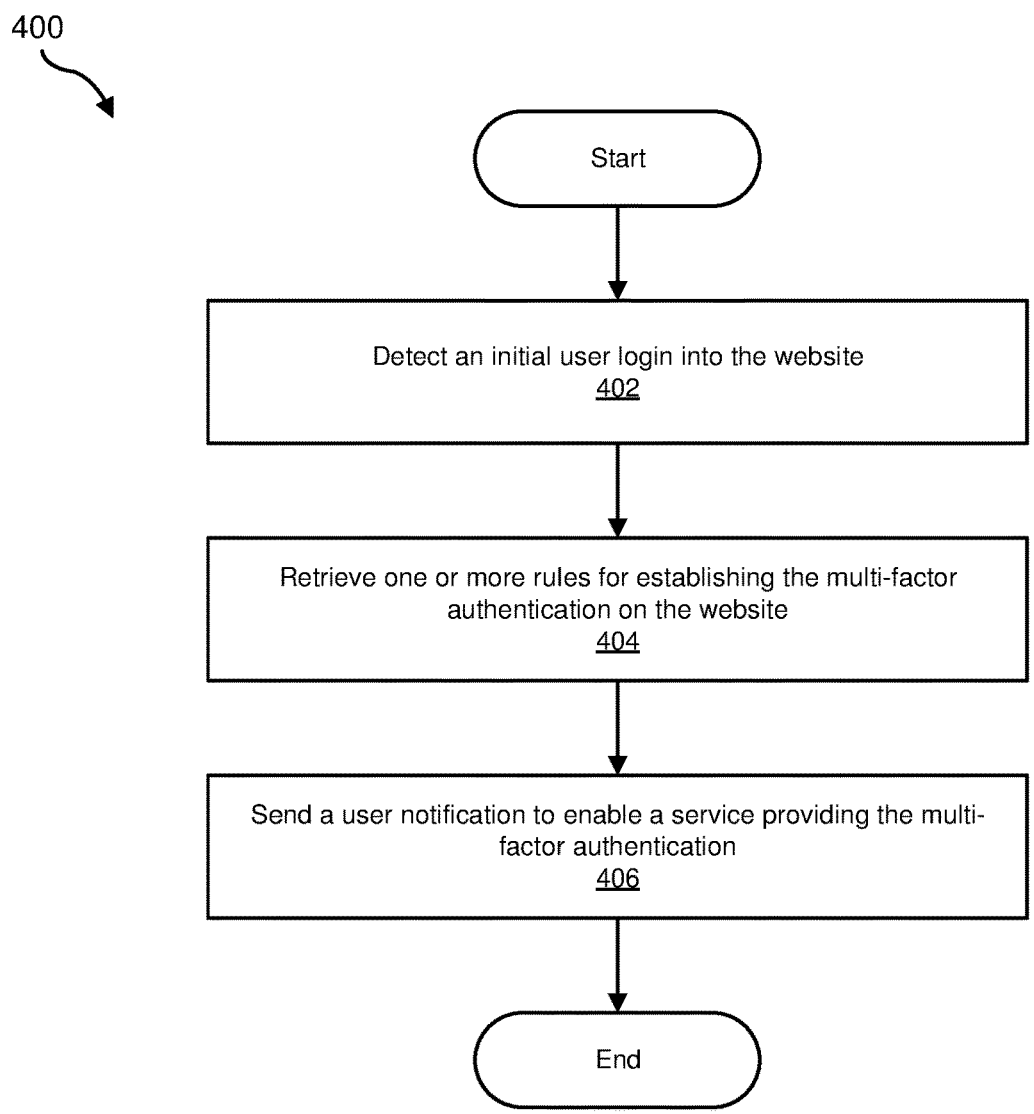
FIG. 4 is a flow diagram of an example method for setting up a user to utilize multi-factor authentication for seamless website logins.

FIG. 4 is a flow diagram of an example computer-implemented method 400 for setting up a user to utilize multi-factor authentication for seamless website logins. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may detect an initial user login into the website. For example, setup module 104 may, as part of computing device 202 in FIG. 2, may detect an initial login utilizing user login credentials 222 on a website 210.

Setup module 104 may detect the initial login into a website 210 in a variety of ways. In some examples, setup module 104 may monitor each time a user enters their user login credentials 222 to sign-on to websites 210. In some embodiments, setup module 104 may also determine if websites 210 support multi-factor authentication and, if so, record this data for future operations.

At step 404, one or more of the systems described herein may retrieve one or more rules for establishing the multi-factor authentication on the website. For example, setup module 104 may, as part of computing device 202 in FIG. 2, retrieve multi-factor authentication rules 212 for one or more websites 210.

Setup module 104 may retrieve multi-factor authentication rules 212 in a variety of ways. In some examples, setup module 104 may, after confirming that a website 210 supports multi-factor authentication, download multi-factor authentication rules 212 from server 206. In some examples, setup module 104 may download multi-factor authentication rules 212 for a single website 210. In other examples, setup module 104 may download multi-factor authentication rules 212 for multiple websites 210 based on previously detected user logins with user login credentials 222.

At step 406, one or more of the systems described herein may send a user notification to enable a service providing the multi-factor authentication. For example, setup module 104 may, as part of computing device 202 in FIG. 2, send a user notification to an owner of user login credentials 222 to enable multi-factor identification on one or more websites 210.

Setup module 104 may send the user notification in a variety of ways. In some examples, setup module 104 may send a notification to computing device 202 from which user login credentials 222 were previously sent to one or more websites 210. In one example, the notification may include instructions for the user to opt-in to a multi-factor authentication service provided by one or more websites 210 based on multi-factor authentication rules 212. Upon the user enabling multi-factor authentication on one or more websites, setup module may then generate numerical sequence 212 as discussed above at step 302 in FIG. 3.

Figure 5:
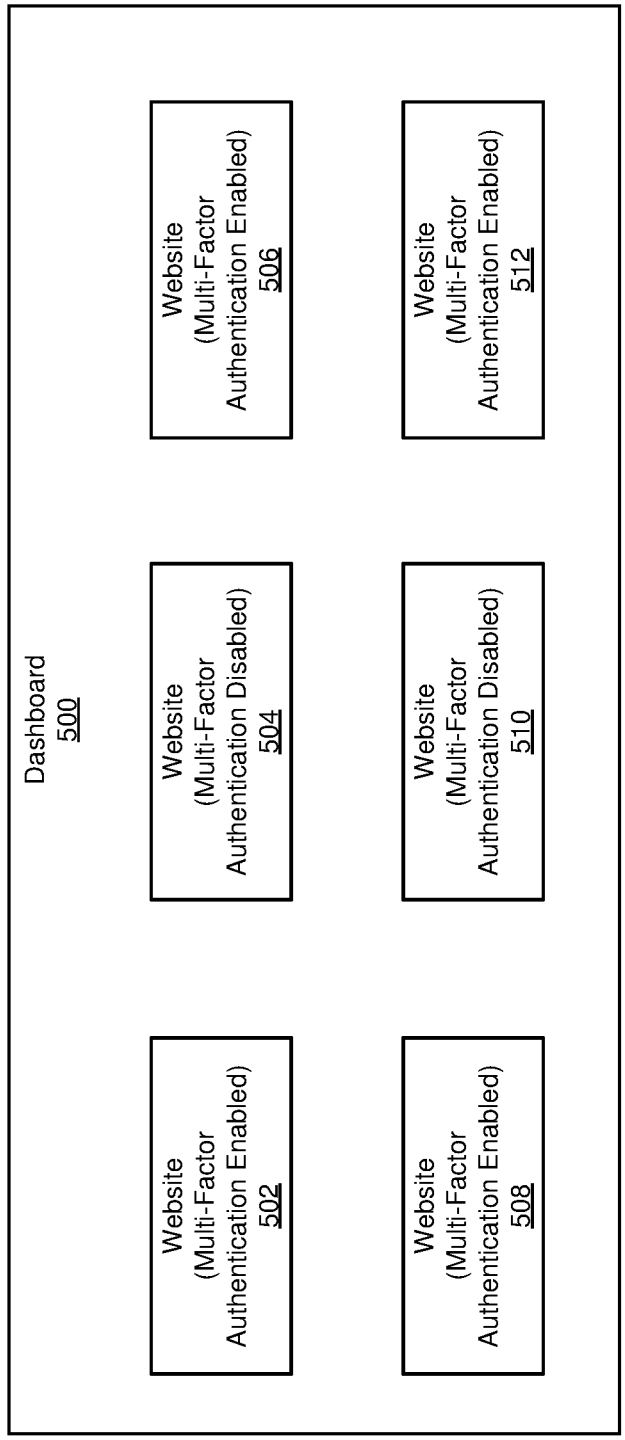
FIG. 5 is a block diagram of an example dashboard in an example system for enabling multi-factor authentication for seamless website logins.

FIG. 5 is a block diagram of an example dashboard 500 in an example system for enabling multi-factor authentication for seamless website logins. In some examples, dashboard 500 may be generated and displayed on computing device 202 by setup module 104. For example, setup module 104 may display dashboard 500 showing multiple icons or screenshots representing websites 502, 504, 506, 508, 510, and 512 supporting multi-factor authentication that a user has previously accessed utilizing user login credentials 222. In some embodiments, dashboard 500 may further include an indication of which websites 502-512 that a user does not currently have multi-factor authentication enabled. For example, dashboard 500 may indicate that multi-factor authentication is enabled on websites 502, 506, 508, and 512, while multi-factor authentication is disabled on websites 504 and 510, for a user who has previously accessed websites 502-512 using user login credentials 222. In some embodiments, setup module 104 may send a notification to the user, based on dashboard 500, inviting the user to enable multi-factor authentication for websites 504 and 510 utilizing the methods described above in FIGS. 3-4.

As explained above in connection with example method 300 in FIG. 3, the systems and methods herein may utilize a privacy and identify protection security application to provide a feature that promotes the user of multi-factor authentication (e.g., second factor authentication) methods using anonymized and/or existing telephone numbers and allow the user to seamlessly login to compatible websites once a user vault storing a received credential is opened. In some examples, the security application may include a number of components/services including a password manager having access to user logins, a component/service for identifying websites able to setup multi-factor authentication, a component/service able to setup multi-factor authentication on the identified websites (e.g., by using site specific rules), and a component/service able to interact with a user's multi-factor authentication device (e.g., a mobile phone or phone API) with which a trust relationship may be formed. In some embodiments, the security application may utilize the password manager and the components/services to (1) determine if a website enables multi-factor authentication and, if so, download any setup rules, (2) provide a user with a notification to turn on multi-factor authentication on the website, (3) if the user opts in, seamlessly generate an anonymized phone number or use an existing phone number and setup multi-factor authentication for the website, (4) when the website requests a confirmation code or token to be entered, utilize API access to user's mobile phone or multi-factor authentication device to retrieve the confirmation code or token via a secure channel and automatically fill it into the website such that the user is seamlessly enrolled, (5) detect a user sign-in to the website using their credentials, and (6) upon receiving a request from the website, programmatically retrieve the confirmation code or token using the APIs and fill it for the user on the website thereby logging-in the user. In some examples, the security application may also be enabled to offer the user to update multi-factor authentication for multiple sites simultaneously from a dashboard view generated by the application.

Figure 6:
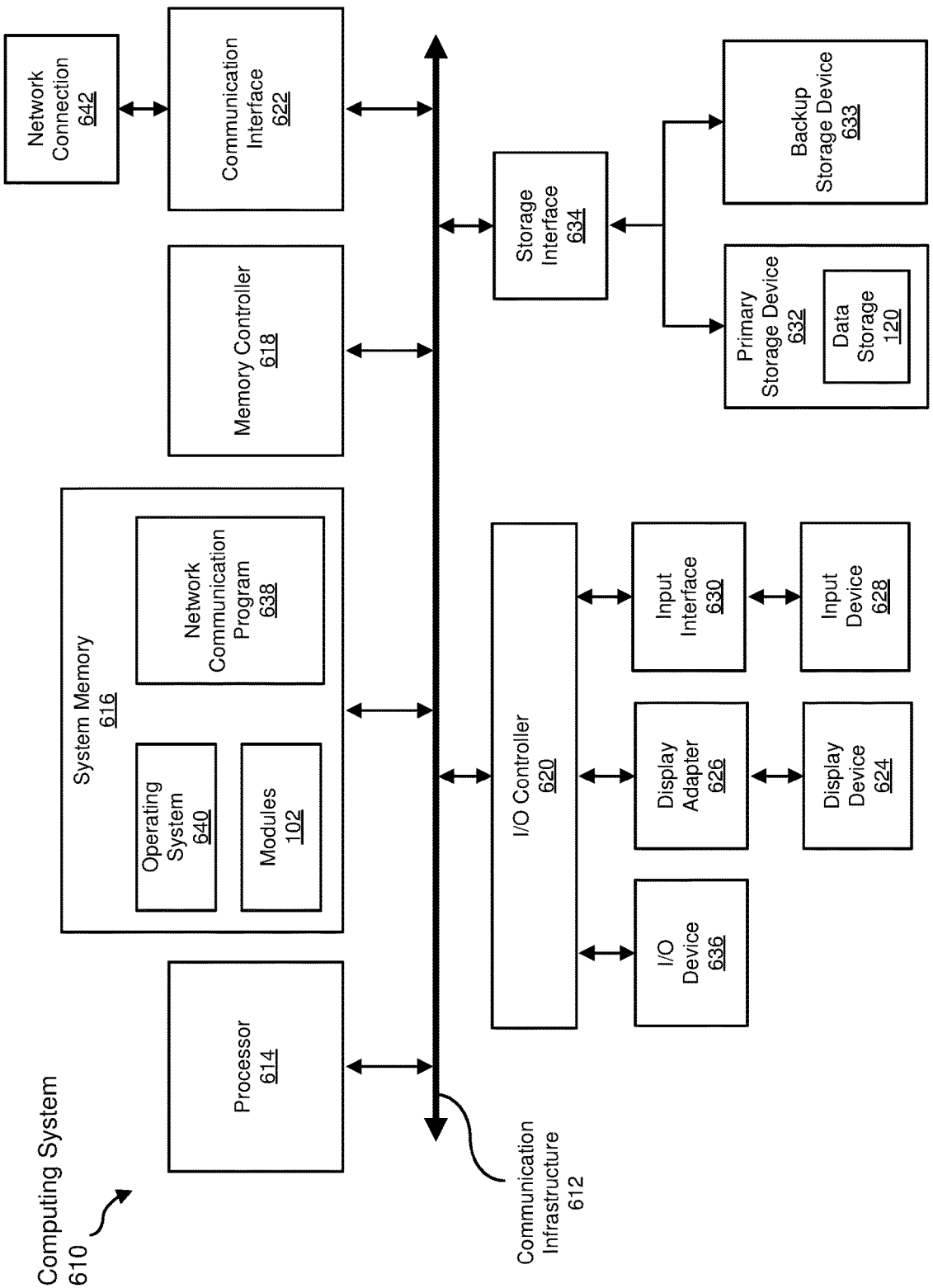
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
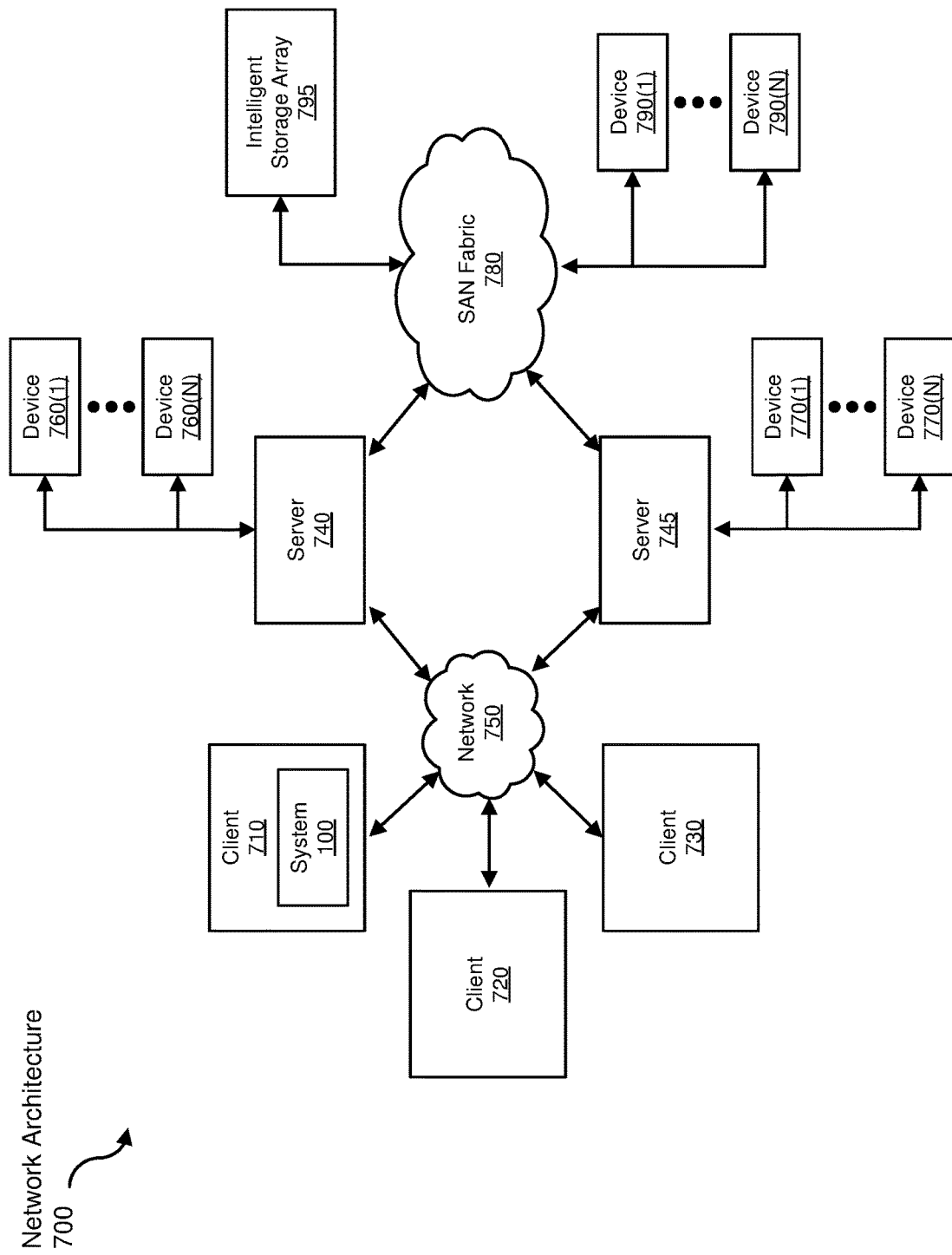
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for enabling multi-factor authentication for seamless website logins.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enabling multi-factor authentication for seamless website logins, at least a portion of the method being performed by a computing device comprising at least one processor, the method comprising:
- generating, by the computing device, a numerical sequence utilized for authenticating a user for multi-factor authentication on a website;
- detecting, by the computing device, user login credentials for initiating a multi-factor authentication session on the website;
- receiving, by the computing device and in response to the user login credentials, a request for multi-factor authentication data associated with the numerical sequence from the website;
- retrieving, by the computing device and utilizing an application programming interface (API), the multi-factor authentication data from a secure storage associated with the user;
- providing, by the computing device and utilizing the API, the multi-factor authentication data to the website to login the user;
- displaying, by the computing device, a dashboard comprising a plurality of websites providing multi-factor authentication services; and
- sending, by the computing device, a user notification comprising a request to enable the multi-factor authentication services.

2. The computer-implemented method of claim 1, further comprising:
- detecting an initial user login into the website;
- retrieving one or more rules for establishing the multi-factor authentication on the website; and
- sending a user notification comprising a request to enable a service providing the multi-factor authentication.

3. The computer-implemented method of claim 1, further comprising:
- sending a request to unlock the secure storage; and
- receiving a confirmation that the secure storage is unlocked.

4. The computer-implemented method of claim 1, wherein generating the numerical sequence comprises generating an anonymized telephone number.

5. The computer-implemented method of claim 1, wherein generating the numerical sequence comprises retrieving an existing telephone number associated with the user.

6. The computer-implemented method of claim 1, wherein the multi-factor authentication data comprises a confirmation code sent from the website to the secure storage utilizing the numerical sequence.

7. The computer-implemented method of claim 1, wherein the multi-factor authentication data comprises a token sent from the website to the secure storage utilizing the numerical sequence.

8. A system for enabling multi-factor authentication for seamless website logins, the system comprising:
- at least one physical processor;
- physical memory comprising a plurality of modules and computer-executable instructions that, when executed by the physical processor, cause the physical processor to:
  - generate, by a setup module, a numerical sequence utilized for authenticating a user for multi-factor authentication on a website;
  - detect, by a detection module, user login credentials for initiating a multi-factor authentication session on the website;
  - receive, by a receiving module and in response to the user login credentials, a request for multi-factor authentication data associated with the numerical sequence from the website;
  - retrieve, by a login module utilizing an application programming interface (API), the multi-factor authentication data from a secure storage associated with the user;
  - provide, by the login module utilizing the API, the multi-factor authentication data to the website to login the user;
  - display, by the setup module, a dashboard comprising a plurality of websites providing multi-factor authentication services; and
  - send, by the setup module, a user notification to enable the multi-factor authentication services.

9. The system of claim 8, wherein the setup module further causes the physical processor to:
- detect an initial user login into the website;
- retrieve one or more rules for establishing the multi-factor authentication on the website; and
- send a user notification to enable a service providing the multi-factor authentication.

10. The system of claim 8, wherein the login module further causes the physical processor to:
- send a request to unlock the secure storage; and
- receive a confirmation that the secure storage is unlocked.

11. The system of claim 8, wherein the setup module generates the numerical sequence by generating an anonymized telephone number.

12. The system of claim 8, wherein the setup module generates the numerical sequence by retrieving an existing telephone number associated with the user.

13. The system of claim 8, wherein the multi-factor authentication data comprises a confirmation code sent from the website to the secure storage utilizing the numerical sequence.

14. The system of claim 8, wherein the multi-factor authentication data comprises a token sent from the website to the secure storage utilizing the numerical sequence.

15. A non-transitory computer-readable medium comprising one or more computer-executable instructions that, when executed by at least one processor of a computing device, cause the computing device to:
- generate a numerical sequence utilized for authenticating a user for multi-factor authentication on a website;
- detect user login credentials for initiating a multi-factor authentication session on the website;
- receive, in response to the user login credentials, a request for multi-factor authentication data associated with the numerical sequence from the website;
- retrieve, utilizing an application programming interface (API), the multi-factor authentication data from a secure storage associated with the user;
- provide, utilizing the API, the multi-factor authentication data to the website to login the user;
- display a dashboard comprising a plurality of websites providing multi-factor authentication services; and
- send a user notification to enable the multi-factor authentication services.

16. The non-transitory computer-readable medium of claim 15, wherein the one or more computer-executable instructions further cause the computing device to:
- detect an initial user login into the website;
- retrieve one or more rules for establishing the multi-factor authentication on the website; and send a user notification to enable a service providing the multi-factor authentication.

17. The non-transitory computer-readable medium of claim 15, wherein the one or more computer-executable instructions further cause the computing device to:
send a request to unlock the secure storage; and
receive a confirmation that the secure storage is unlocked.

\* \* \* \* \*